W. P. McKINNEY.
SAFETY HOOK.
APPLICATION FILED MAY 14, 1920.
1,367,270.
Patented Feb. 1, 1921.
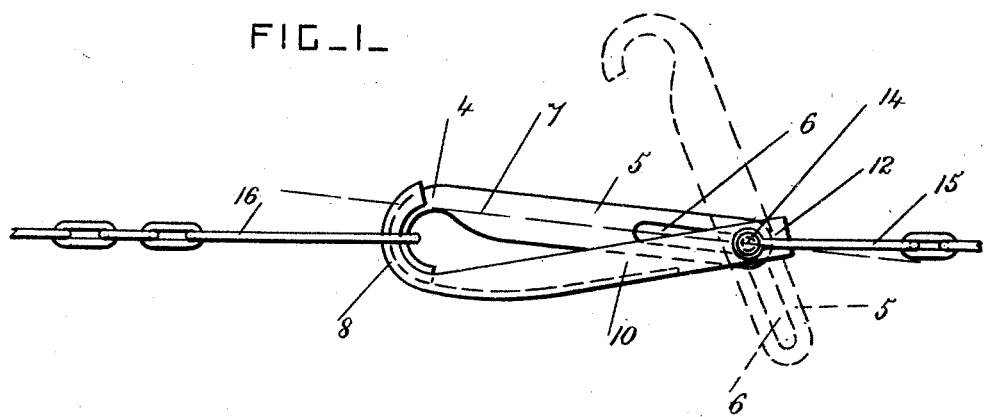
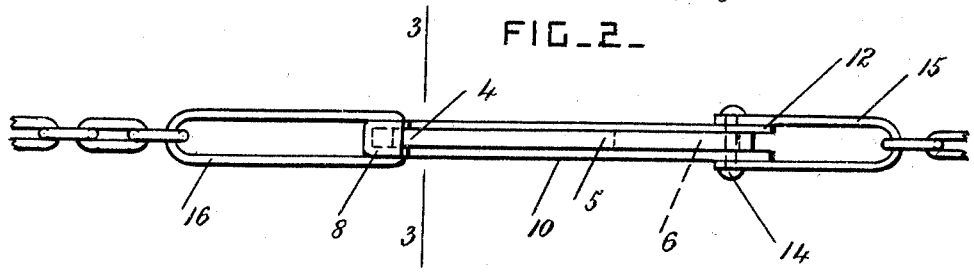
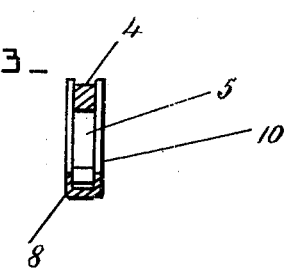
Inventor.
Wm. P. McKinney
by Herbert W. F. Jenner.
Attorney.

UNITED STATES PATENT OFFICE.

WILLIAM P. McKINNEY, OF TACOMA, WASHINGTON.

SAFETY-HOOK.

1,367,270. Specification of Letters Patent. Patented Feb. 1, 1921.

Application filed May 14, 1920. Serial No. 381,417.

*To all whom it may concern:*

Be it known that I, WILLIAM P. McKIN-NEY, a citizen of the United States, residing at Tacoma, in the county of Pierce and State of Washington, have invented certain new and useful Improvements in Safety-Hooks, of which the following is a specification.

This invention relates to safety hooks used in connection with chains on all kinds of lifting tackle and other similar devices; and it consists in the novel construction and combination of the parts hereinafter fully described and claimed.

In the drawings, Figure 1 is a side view of a safety hook constructed according to this invention. Fig. 2 is a plan view of the same. Fig. 3 is a cross-section through the hook, taken on the line 3—3 in Fig. 2.

The hook 4 is provided with a straight shank 5, and is formed of a flat bar or plate. The shank 5 has a slot 6 formed longitudinally in it and arranged with its center line 7 at substantially a tangent to the curved inner side of the hook next to its shank. A guard 8 for the hook is provided, and is channel-shaped in cross-section. This guard has a curved portion which fits over the hook 4, and it has a straight shank 10 which is arranged diagonally of the straight shank 5 of the hook. The shank 10 has a forked end portion 12, and 14 is a pin which passes through the forked end portion and the slot 6 and which is slidable in the said slot.

The pin 14 is provided with a long shackle 15 for connecting it to a chain or other similar lifting device. A long link 16 is provided and is attached to a chain or other lifting device and engages with the hook and its guard.

When the parts are in the positions shown in full lines in Fig. 1, it is impossible for the hook to become detached from the link.

The hook is retracted, and moved pivotally to the position shown in dotted lines in Fig. 1 in order to disengage the link from the hook, the shackle being made of sufficient length to permit of this movement.

What I claim is:

A safety hook, comprising a hook provided with a straight shank having a longitudinal slot which has its center line arranged at substantially a tangent to the curved inner side of the hook next to its shank, a guard for the hook having a straight shank and a hooked end portion which are channel-shaped in cross-section, said hooked portion being adapted to fit over the said hook and said shank being arranged diagonally of the shank of the hook and provided with a forked end portion having pin holes which register with the said slot, and a shackle provided with a pin which engages with the said pin holes and slot.

In testimony whereof I have affixed my signature.

WM. P. McKINNEY.